United States Patent [19]
Reed et al.

[11] 4,149,659
[45] Apr. 17, 1979

[54] FEED RETURN IMPELLER

[75] Inventors: Joseph M. Reed; John E. Hartman, both of Holland, Mich.

[73] Assignee: Favorite Manufacturing, Inc., New Holland, Pa.

[21] Appl. No.: 871,699

[22] Filed: Jan. 23, 1978

[51] Int. Cl.² .................. G01F 11/00; A01K 5/02
[52] U.S. Cl. .................. 222/318; 119/51 CF; 119/52 R
[58] Field of Search ......... 119/51 CF, 51 FS, 52 AF; 74/243 C; 198/540, 562, 580, 735; 222/226, 231, 318

[56] References Cited

U.S. PATENT DOCUMENTS

| | | | |
|---|---|---|---|
| 541,614 | 6/1895 | Hunt et al. | 198/562 X |
| 2,589,690 | 3/1952 | Graetz | 119/51 CF X |
| 3,236,365 | 2/1966 | Erisman | 198/580 |
| 3,272,400 | 9/1966 | Van Huis | 119/52 AF X |
| 3,292,586 | 12/1966 | Rigterink | 119/52 AF |
| 3,650,158 | 3/1972 | Van Huis | 74/243 C |
| 3,731,852 | 5/1973 | Van Huis | 222/318 |

Primary Examiner—Robert P. Swiatek
Attorney, Agent, or Firm—Stanley B. Kita

[57] ABSTRACT

A closed loop feed trough having a feed chain moveable lengthwise therein to distribute feed from a hopper associated with the trough provided with an impeller which rotates in response to movement of the chain to assist in returning uneaten feed to the hopper. The impeller is mounted in the hopper adjacent its inlet and is fabricated in two halves which are fastened to opposite sides of a drive sprocket which engages the feed chain. Each half of the impeller has a hub and a series of vanes extending outwardly and rearwardly at spaced intervals from the hub to provide a series of buckets between the vanes. A baffle overlies the impeller to shield the buckets from feed in the hopper as they rotate downwardly toward the inlet while affording unloading of feed from between the vanes as they rotate upwardly away from the feed chain.

13 Claims, 4 Drawing Figures

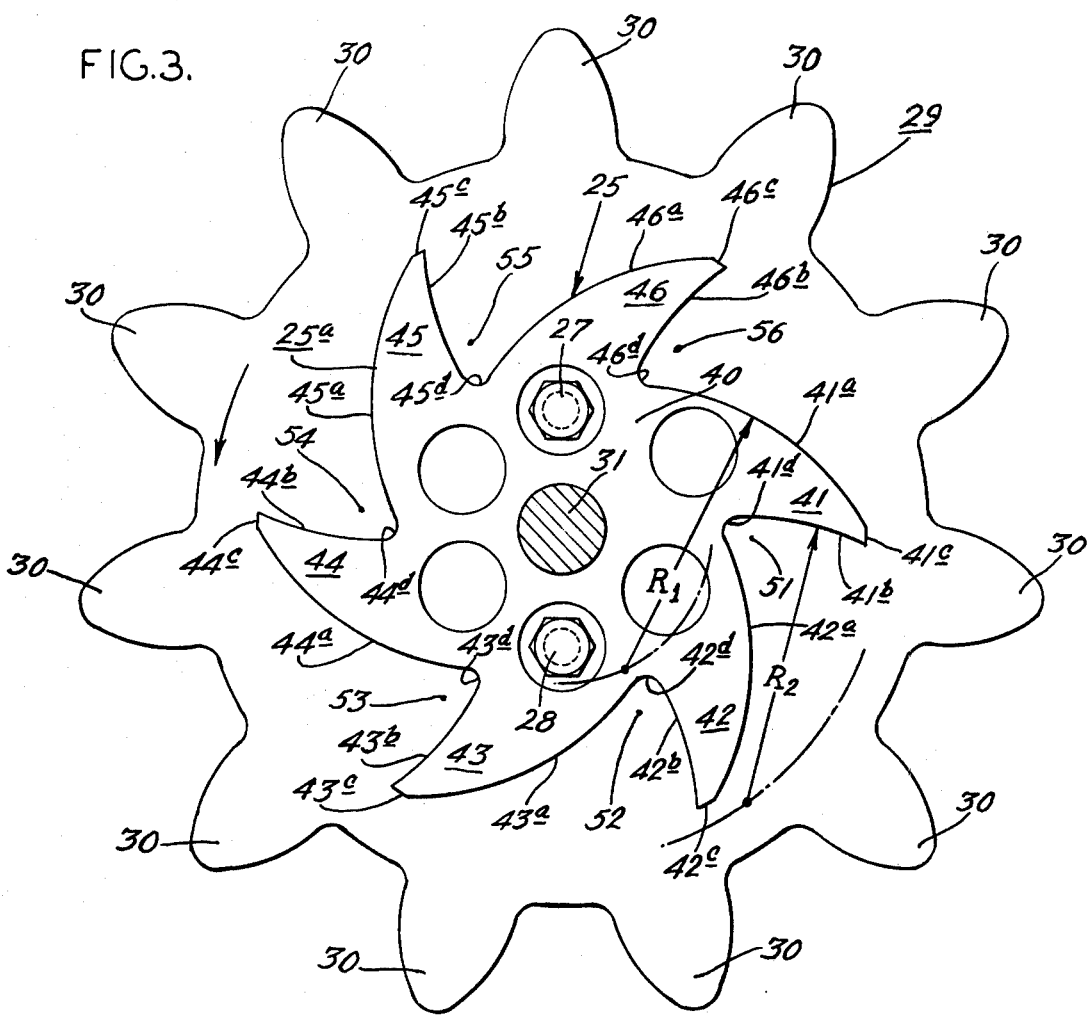
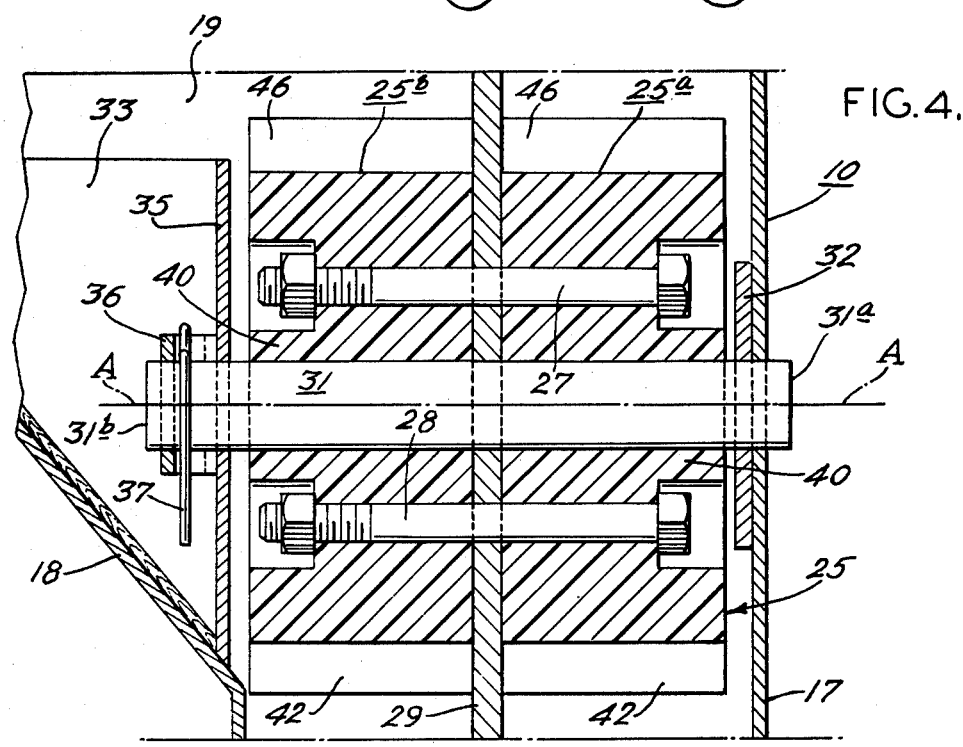

FEED RETURN IMPELLER

The present invention relates to automatic feeding devices, and more particularly, the present invention relates to automated poultry feeding systems having means for returning uneaten feed to a feed supply hopper.

Various devices are known for returning uneaten feed to a supply hopper in a closed circuit poultry feeding system. One such device is disclosed in U.S. Pat. No. 2,589,690 issued to W. P. Graetz. The Graetz device comprises a feed hopper within which is mounted a rotary assembly comprising a pair of elliptically-shaped members mounted in angularly-offset relation on opposite sides of a sprocket rotated by a feed chain as it advances through the hopper. A pair of leaf springs engage the undersides of the members as they rotate to prevent feed in the hopper from being returned to the inlet by the action of the rotating assembly.

Although the Graetz device may function satisfactorily in certain applications, it was described in U.S. Pat. No. 3,272,400 (RE27,035) issued to R. L. VanHuis as having a tendency to jam. In order to overcome this proclivity, the Van Huis patent disclosed a flanged cylindrical feed wheel mounted in the hopper adjacent its inlet to rotate in response to movement of the feed chain to compact feed against the bottom of the hopper and among the chain links. The periphery of the feed wheel extends into close proximity with the feed chain to effect the desired compacting action so that the chain can advance the compacted feed through the hopper.

The rotary device disclosed in the Van Huis patent is not entirely satisfactory because it both compacts the feed and consumes power in the compaction process. Although subsequent improvements were made to the Van Huis feed wheel, such as disclosed in U.S. Pat. Nos. 3,650,158 and 3,731,852 also issued to Van Huis, such improvements do not ameliorate the disadvantages associated with the feed compaction concept. Thus, a rotary feed return device which functions to return feed in a loose condition and with a minimum of power is highly desirable.

With the foregoing in mind, a primary object of the present invention is to provide an improved feed return device which overcomes the limitations associated with the aforementioned prior art feed return devices.

It is another object of the present invention to provide novel means for returning uneaten feed to a hopper in a relatively loose condition.

It is a further object of the present invention to provide a unique feed return device which functions to return uneaten feed to a hopper with a minimum of power.

Yet another object of the present invention is to provide a simple yet effective feed return device which functions efficiently to return uneaten feed to a hopper.

A still further object of the present invention is to provide a durable and trouble-free feed return assembly which is economical to manufacture and assemble.

More specifically, the present invention provides an impeller for use in a feed hopper to recycle through the hopper uneaten feed returned thereto by a feed chain advancing through the bottom of the hopper. The impeller includes identical halves which are fastened to opposite sides of a sprocket having teeth which engage the feed chain to impart rotary motion to the impeller. Each half of the impeller includes a hub and a series of outwardly and rearwardly tapered vanes spaced apart about the periphery of the hub to provide a series of buckets therebetween. A baffle is mounted in the hopper above the impeller for preventing feed in the hopper from filling the buckets as they descend toward the chain while affording unloading of the feed from the buckets as they ascend away from the chain. Preferably, the vanes have trailing edges which extend substantially radially outwardly from the rotational axis of the hub, and the vanes have leading surfaces which curve forwardly toward the hub to merge therewith at a location adjacent the trailing surface of the forwardly adjacent vane. Thus, the deepest portions of the buckets are located immediately behind the trailing surfaces of the vanes. As a result, movement of the chain through the hopper rotates the impeller and causes uneaten return feed to be recycled in a loose state to the feed hopper with a minimum of power.

These and other objects, features and advantages of the present invention should become apparent from the following description when taken in conjunction with the accompanying drawings in which:

FIG. 3 is an enlarged view in full scale of the feed impeller illustrated in half scale in FIG. 1; and FIG. 4 is an enlarged sectional view taken along line 4—4 of FIG. 1 to illustrate certain details of construction.

Figure 1:
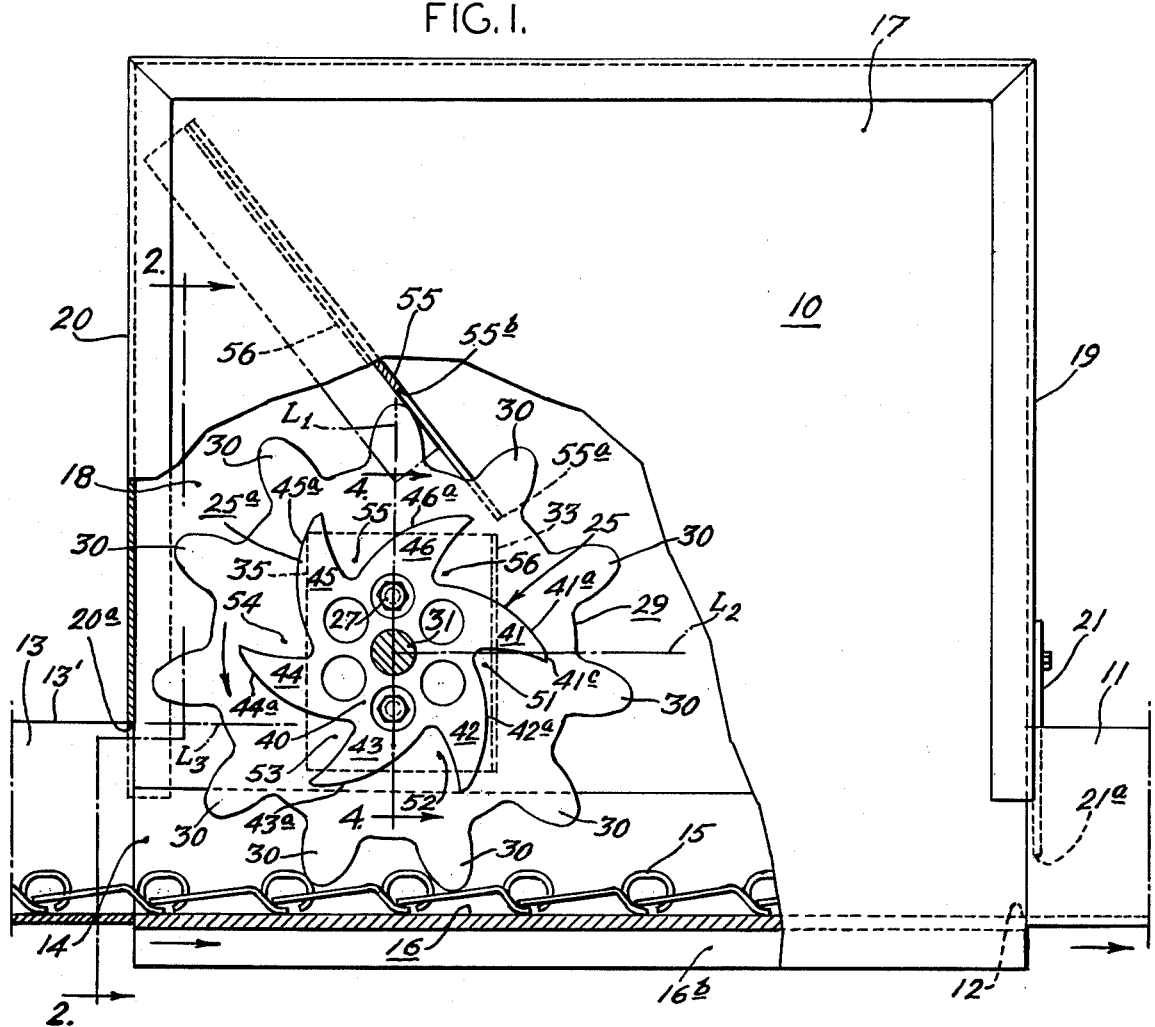
FIG. 1 is a side elevational view of a feed hopper having a portion broken away to expose a feed return impeller which embodies the present invention.
Figure 2:
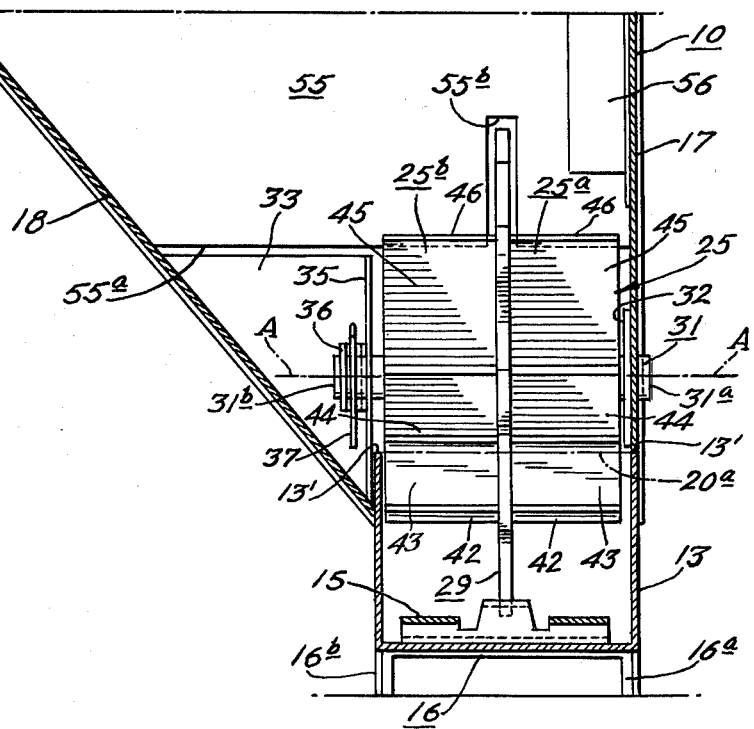
FIG. 2 is a sectional view taken along line 2—2 of FIG. 1.

Referring now to the drawings, FIGS. 1 and 2 illustrate a feed hopper 10 adapted to contain loose granular feed and to supply the feed to a closed circuit feeding system having a feed trough with one end 11 connected to the hopper 10 at its outlet 12 and having another end 13 connected to the hopper 10 at its inlet 14. The inlet 14 and outlet 12 of the hopper 10 are at the same level and are aligned with one another to afford longitudinal movement of a feed chain 15 through the hopper 10 along its bottom 16. The feed chain 15 is driven in a conventional manner at a linear velocity of 40–60 feet per minute by a conventional motor and sprocket arrangement (not shown).

As best seen in FIG. 2, the hopper 10 comprises a vertical side wall 17 which projects upwardly from the outer flange 16a of the inverted channel 16, the upper surface of which forms the bottom of the hopper 10. The hopper 10 also has an upwardly and laterally inclined wall 18 fastened adjacent its lower end to the other flange 16b of the channel 16. Front and rear walls 19 and 20, respectively, are provided to tie together the side walls 17 and 18 and to provide a sturdy hopper 10. A metering plate 21 having a horizontally-extending lower edge 21a is slidably mounted to the front panel 19 and depends into the feed trough 11 for regulating the level of feed leaving the hopper 10 in the trough 11. The rear wall 20 of the hopper 10 has a horizontally extending lower edge 20a extending across the feed trough 13 at a level corresponding substantially to its upper edges 13'. See also the dashed line 20a in FIG. 2.

As described thus far, the hopper, chain and feed trough structure is conventional. Thus, when granular feed is present in the hopper 10, longitudinal movement of the chain 15 along the bottom 16 of the hopper 10 causes a quantity of the feed to be withdrawn from the hopper outlet 12 as determined by the setting of the metering plate 21. The feed is thus advanced in the trough 11 and is thereby served to poultry feeding at various locations along the length of the trough 11. Depending upon the rate at which the feed is withdrawn from the hopper and is consumed by the poultry, uneaten feed may be returned to the hopper inlet 14 via the return length of feed trough 13. If the feed is withdrawn at a greater rate than it is consumed, it can overaccumulate at the inlet 14 and flow over the upper edges 13' of the return feed trough 13 unless adequate means is provided to recycle the thus returned feed into the hopper 10.

In accordance with the present invention, improved rotary means is provided to recycle uneaten returned feed into the hopper to prevent its overaccumulation at the hopper inlet 14. To this end, the improved rotary means includes impeller means 25 mounted in the hopper 10 for rotation about a horizontal axis A overlying the feed chain 15 and disposed transversely thereto. In the present instance, the impeller means 25 is preferably fabricated in two identical halves 25a and 25b which are secured by means of bolts 27 and 28 to opposite sides of a sprocket 29. The sprocket 29 has teeth 30 which are engaged by the feed chain 15 to rotate the impeller means 25 as the feed chain 15 advances longitudinally along the hopper bottom 16.

In the illustrated embodiment, the impeller means 25 is mounted in the hopper 10 for rotation about the axis A by means of a shaft 31 which extends horizontally through a central bore in the impeller halves 25a and 25b and the sprocket 29. The outer end 31a of the shaft 31 is supported by the side wall 17 and a reinforcing plate 32 welded to the inside of the hopper plate 17 to provide additional strength. The inner end 31b of the shaft 31 is supported in a bracket 33 which is welded to the inside of the inclined hopper wall 18 and which is shaped to provide a vertical wall 35 disposed in spaced parallel relation with the side wall 17 so that the walls 17 and 35 extend relatively close to the outsides of the impeller halves 25a and 25b, respectively. The shaft end 31b is received in a bore in the bracket wall 35 and a clip 36 welded to the inside of the bracket wall 35. The shaft 31 is prevented from rotating and moving axially by means of a hair-pin cotter 37 which extends through the inner end 31b of the shaft 31 and engages the clip 36. Preferably, the impeller halves 25a and 25b are molded of Nylatron plastic material which provides both strength and a relatively low friction contact between the impeller halves 25a and 25b and the shaft 31.

Referring again to FIG. 1, each impeller half is identical to the other. Thus, reference will be made hereinafter to the impeller half 25a illustrated in the foreground in FIG. 1 and to the right in FIG. 2. It should be understood that similar reference numerals apply to the other impeller half 25b.

Referring now to FIG. 3, the impeller half 25a has a hub portion 40 and a series of vanes 41–46 extending outwardly from the hub 40 at spaced intervals about its periphery to provide a series of buckets or recesses 51–56. Each vane, such as the vane 43, tapers outwardly and rearwardly relative to the direction of rotation of the sprocket 29. The vane 43 has a leading surface 43a which extends outwardly and rearwardly from the hub 40 and terminates in a tip 43c remote from the hub 40. The vane 43 also has a trailing surface 43b which extends substantially radially outward from the rotational axis A of the hub 40. The leading surface 43a of the vane 43 merges with the hub 40 at the location where the trailing surface 42b of the immediately preceding vane 42 merges with the hub 40 to provide thereat a rounded bight 42d. Preferably, the trailing surface 43b of the vane 43 extends outwardly from the hub 40 a distance corresponding substantially to the arcuate distance between the bight 42d and the bight 43d formed at the intersection of the trailing surface 43b with the leading surface 44a of the immediately succeeding vane 44. In the illustrated embodiment, the leading surface 43a and the trailing surface 43b of the vane 43 converge to form a slightly flattened tip 43c. The widthwise dimension of the feed trough 13 is substantially the same as the widthwise dimension of the hopper inlet 14, and the vanes 41–46 are dimensioned widthwise so that the impeller assembly 25 extends substantially entirely across the full width of the inlet 14.

In the illustrated embodiment, the impeller means 25 has six vanes with an outside tip diameter of about four inches. The bights 42d, 43d, etc. are disposed in a circle having a diameter slightly greater than two inches. Thus, the radial extent of the trailing surface of each vane is about one inch. Preferably, the leading and trailing surfaces of the vanes are curved. In the present instance, each leading surface has a constant radius of curvature $R_1$ of about 1¾ inches drawn from a circle having a one inch radius from the axis A. Each trailing surface has a constant radius of curvature $R_2$ which is drawn from a circle having a radius of 2⅜ inches. Thus, this structure provides the series of buckets or recesses 51–56 having their deepest portions located immediately adjacent the trailing surfaces of the vanes and becoming progressively more shallow in the peripheral direction away from the trailing surfaces.

In order to prevent feed in the hopper 10 from being returned to the inlet 14 as the impeller 25 rotates, shield means is provided above the impeller 25 in the hopper 10. In the present instance, as best seen in FIGS. 1 and 2, the shield means includes a baffle plate 55 which declines rightward in the direction of movement of the chain 15 from a location adjacent the top of the hopper 10 to a location adjacent the periphery of the impeller halves 25a and 25b. The baffle plate 55 extends widthwise from the hopper side wall 17 to the hopper wall 18, and the plate 55 is supported at the side wall 17 by an angle member 56. The baffle plate 55 has an edge 55a which terminates in close proximity to the tips of the vanes 41–46, and the baffle plate 55 has a slot 55b which extends upwardly from its lower edge 55a to accommodate the teeth 30 of the sprocket 29. The lower edge 55a of the baffle plate 55 terminates in the quadrant defined by a vertical line $L_1$ and horizontal line $L_2$ drawn through the rotational axis A of the impeller 25, and preferably between the 1 and 2 o'clock positions in the quadrant. See FIG. 1.

In order to ensure recycling of the feed in a loose condition, the impeller 25 is mounted at a predetermined height relative to the bottom 16 of the hopper 10. To this end, the shaft 31 providing the rotational axis A is located so that the root circle of the vanes 41–46 is located at about the level of a line $L_3$ drawn parallel to the hopper bottom 16 and through the top 20a of the hopper inlet 14. This assures that only the vanes 41–46 dip below the inlet edge 20a as the impeller 25 rotates and that the deepest portions of the buckets 51–56 are disposed at about the level of the inlet edge 20a. Thus, although the sprocket teeth extend outwardly beyond the vane tips 41c–46c, the vanes extend toward the hopper bottom 16 about half the distance between the root circle of the vanes 41–46 and the hopper bottom 16.

In operation, feed contained within the hopper 10 is pulled by the chain 15 through the outlet 12 as the chain 15 is advanced in the direction indicated by the arrow in FIG. 1. Movement of the chain 15 causes the sprocket 29 to rotate the impeller 25 in the counterclockwise direction indicated by the arrow. This motion of the chain 15 and rotation of the impeller 25 ensures motion of the feed rightward toward the hopper outlet 12.

When the level of return feed advanced by the chain 15 through the hopper inlet 14 reaches a minimum depth about one-half the depth of the trough 13, the returned feed is engaged by the leading surfaces 41a–46a of the vanes 41–46 as the impeller 25 rotates. Although the exact manner in which the impeller 25 functions cannot be fully explained, it is believed that loose feed above the minimum depth is engaged by the leading surfaces 41a–46a of the vanes 41–46 as they advance toward the feed chain 15 and is displaced into the buckets 51–56 between the vanes 41–46 where it is loosely contained until unloaded therefrom as the buckets advance counterclockwise to about the 3 o'clock position. The buckets 51–56 are prevented from being refilled by feed above the impeller 25 as they advance counterclockwise toward the inlet by virtue of the baffle plate 55 which shields the impeller 25 in the manner illustrated. Actual tests have shown that an impeller such as disclosed herein having six vanes functions satisfactorily to prevent overaccumulation of feed at the hopper inlet 14 with chain speeds ranging between 40 and 60 feet per minute.

In view of the foregoing, it should be apparent that the impeller functions to recycle return feed into a hopper with a minimum of power consumption. This is because the impeller does not rely upon a compaction principle to achieve the desired action. Rather, the impeller functions to displace feed in a relatively loose manner into the hopper. Since the impeller is fabricated in halves of molded plastic material, it can be manufactured economically. Moreover, because the impeller has only a few moving parts, it is relatively troublefree in operation.

Thus, while a preferred embodiment of the present invention has been described in detail, various modifications alterations and changes may be made without departing from the spirit and scope of the present invention as defined in the appended claims.

We claim:

1. In combination with a closed loop feed system including a trough, a feed chain mounted for movement lengthwise therein to advance feed forwardly in the trough, a feed hopper having an inlet and an outlet adjacent its bottom affording movement of the chain therethrough, rotary means mounted in the hopper adjacent its inlet for rotation above the chain about an axis transverse to the path of movement thereof, and shield means in said hopper overlying the rotary means for cooperating therewith to assist in returning uneaten feed to the hopper as the feed chain advances, the improvement wherein said rotary means comprises:
   impeller means having a hub portion and a series of vanes extending outwardly at peripherally spaced intervals about said hub,
   said vanes having leading surfaces extending outwardly and rearwardly from said hub and having trailing surfaces shaped to provide between the leading and trailing surfaces of adjacent vanes a series of buckets having relatively deep portions located behind said trailing surfaces,
   means mounting said hub for rotation about said axis, and means for rotating said hub in the direction of motion of the chain,
   whereby return feed above a predetermined level on the advancing chain is engaged by the leading surfaces of the vanes and is swept into the hopper.

2. Apparatus according to claim 1 wherein each leading surface curves rearwardly relative to the direction of rotation of said hub, and each trailing surface extends substantially radially outward from said hub a distance corresponding substantially to the peripheral extent of the vane at the hub.

3. Apparatus according to claim 2 wherein said trailing surface curves rearwardly to merge with said leading surface to form a vane tip remote from said hub, and the leading surface of one vane merges with the trailing surface of its forwardly adjacent vane to provide each bucket with its deepest portion located immediately behind said forwardly adjacent vane.

4. Apparatus according to claim 3 wherein said vanes are molded integrally with said hub and said hub rotating means includes a sprocket extending outwardly beyond the tips of said vanes for engaging said feed chain to provide said hub rotating means operable upon movement of said feed chain through said hopper to rotate said impeller means.

5. Apparatus according to claim 4 wherein said impeller means is molded in two identical halves and said sprocket is interposed between said halves and is secured thereto.

6. Apparatus according to claim 5 wherein said vanes are six in number and said impeller means has a widthwise dimension corresponding substantially to the widthwise dimension of said hopper inlet.

7. In combination with a closed loop feed system including a trough, a feed chain mounted for movement lengthwise therein to advance feed forwardly in the trough, a feed hopper having an inlet and an outlet adjacent its bottom affording movement of the chain therethrough, rotary means mounted in the hopper adjacent its inlet for rotation above the chain about an axis transverse to the path of movement thereof, and shield means in said hopper overlying the rotary means for cooperating therewith to assist in returning uneaten feed to the hopper as the feed chain advances, the improvement wherein said rotary means comprises:
   impeller means having a hub and a series of outwardly and rearwardly tapered vanes spaced apart about the periphery of the hub to provide therebetween a series of inwardly extending peripheral buckets,
   means mounting said hub for rotation at a predetermined location above the hopper bottom to cause the vanes to dip below the top of the hopper inlet for engaging return feed above a predetermined level on the feed chain, and
   means for rotating said hub at a predetermined speed relative to the velocity of the chain for causing return feed engaged by said vanes to be propelled forwardly into the hopper upon movement of the feed chain.

8. Apparatus according to claim 7 wherein the vanes have leading and trailing surfaces and the leading surface of each vane curves away from said hub at the location where the trailing surface of the immediately preceding vane merges with said hub.

9. Apparatus according to claim 8 wherein said trailing surface extends substantially radially outward from said hub to terminate in a narrow tip, and the leading surface extends forwardly from said tip to merge with the hub and provide said tapered vane with a root having a width corresponding substantially to the radial extent of the trailing surface.

10. Apparatus according to claim 9 wherein said vane roots are disposed in a circle having a horizontal tangent extending in substantial alignment with the top of the hopper inlet and parallel to the hopper bottom so that return feed is accommodated loosely in the buckets.

11. Apparatus according to claim 10 wherein said vanes depend below said tangent so that the lowermost extent of the path of movement of their tips is about halfway between said tangent and said hopper bottom.

12. Apparatus according to claim 11 wherein said shield means includes an inclined baffle plate overlying said impeller means and terminating in a quadrant defined by vertical and horizontal planes extending through the hub axis.

13. Apparatus according to claim 12 wherein said rotating means includes a sprocket extending outwardly beyond said vanes for engagement by said feed chain to impart rotary motion to said impeller means upon lengthwise movement of the chain through the hopper.

* * * * *